(12) United States Patent
Avila et al.

(10) Patent No.: US 8,713,107 B2
(45) Date of Patent: Apr. 29, 2014

(54) METHOD AND SYSTEM FOR REMOTE DELIVERY OF EMAIL

(76) Inventors: J. Albert Avila, Longboat Key, FL (US); Lev Elbert, Sarasota, FL (US); Andy Estes, Sarasota, FL (US); Mark Famiglio, Sarasota, FL (US); Brian Johnson, Bradenton, FL (US); Baird Juckett, Baltimore, MD (US); Rob Lincoln, Sarasota, FL (US); Don Ruth, Sarasota, FL (US); Jason Sackett, Columbia, MD (US); Russ Saul, Bradenton, FL (US); Norman Worthington, Sarasota, FL (US)

( * ) Notice: Subject to any disclaimer, the term of this patent is extended or adjusted under 35 U.S.C. 154(b) by 173 days.

(21) Appl. No.: 10/236,625

(22) Filed: Sep. 6, 2002

(65) Prior Publication Data
US 2003/0126216 A1 Jul. 3, 2003

Related U.S. Application Data

(60) Provisional application No. 60/317,832, filed on Sep. 6, 2001.

(51) Int. Cl.
*G06F 15/16* (2006.01)

(52) U.S. Cl.
USPC ........... 709/206; 709/203; 709/207; 709/218; 709/225; 709/247

(58) Field of Classification Search
USPC .................. 709/203, 206, 207, 218, 225, 247
See application file for complete search history.

(56) References Cited

U.S. PATENT DOCUMENTS

| | | | |
|---|---|---|---|
| 6,219,694 B1 * | 4/2001 | Lazaridis et al. ............. 709/206 |
| 6,233,318 B1 * | 5/2001 | Picard et al. ................ 379/88.17 |
| 6,324,648 B1 * | 11/2001 | Grantges, Jr. ................... 726/12 |
| 6,389,455 B1 * | 5/2002 | Fuisz ............................. 709/206 |
| 6,389,457 B2 | 5/2002 | Lazaridis |
| 6,401,113 B2 | 6/2002 | Lazaridis |
| 6,427,164 B1 * | 7/2002 | Reilly ........................... 709/206 |
| 6,438,215 B1 * | 8/2002 | Skladman et al. ........... 379/67.1 |
| 6,438,585 B2 | 8/2002 | Mousseau |
| 6,442,589 B1 * | 8/2002 | Takahashi et al. ............ 709/203 |
| 6,449,343 B1 * | 9/2002 | Henderson ................ 379/88.14 |
| 6,505,236 B1 * | 1/2003 | Pollack ......................... 709/206 |
| 6,513,003 B1 * | 1/2003 | Angell et al. ................. 704/235 |

(Continued)

*Primary Examiner* — Rupal Dharia
*Assistant Examiner* — Van Kim T Nguyen
(74) *Attorney, Agent, or Firm* — Robert B. Famiglio; Famiglio & Associates

(57) ABSTRACT

A system and method for delivering electronic mail to the user at a previously defined remote location which also allows the user to reply to the email from such remote location is disclosed. An application program operates at the user's home electronic mail communication system, typically a desktop PC, forwarding electronic mail messages through the internet to a central system, which contains user profile information and acts as a forwarding server. The system can also be applied to the user's mail server instead of the user's desktop PC. Preferred user profiles stored in the forwarding server determine how the server directs notification of new email to the user in accordance with the user's preferred profile. Information regarding the pending emails are directed to the user's mobile telephone or PDA device, allowing the user to determine whether to respond to the electronic mail presently or defer response, in accordance with the user's preference at the time of receipt. The system provides for translation of email messages from text to speech for delivery to the user and also provides for speech to text transcription in the message response mode at the user's selection.

1 Claim, 2 Drawing Sheets

(56) References Cited

U.S. PATENT DOCUMENTS

| | | | |
|---|---|---|---|
| 6,621,502 B1 * | 9/2003 | Nair et al. | 715/716 |
| 6,707,891 B1 * | 3/2004 | Guedalia | 379/88.17 |
| 6,728,357 B2 * | 4/2004 | O'Neal et al. | 379/201.04 |
| 6,779,022 B1 * | 8/2004 | Horstmann et al. | 709/206 |
| 6,801,932 B1 * | 10/2004 | Picoult et al. | 709/206 |
| 6,892,222 B2 * | 5/2005 | McDowell et al. | 709/206 |
| 6,938,065 B2 * | 8/2005 | Jain | 709/201 |
| 6,947,738 B2 * | 9/2005 | Skog et al. | 455/426.1 |
| 6,950,854 B2 * | 9/2005 | Ballard | 709/206 |
| 6,957,248 B2 * | 10/2005 | Quine et al. | 709/206 |
| 6,981,023 B1 * | 12/2005 | Hamilton et al. | 709/206 |
| 7,212,617 B2 * | 5/2007 | Owens et al. | 379/93.24 |
| 7,243,069 B2 * | 7/2007 | Jaepel et al. | 704/235 |
| 2001/0049745 A1 * | 12/2001 | Schoeffler | 709/238 |

* cited by examiner

METHOD AND SYSTEM FOR REMOTE DELIVERY OF EMAIL

CROSS REFERENCES TO RELATED APPLICATIONS

This application claims the benefit of the applicant's provisional application, Ser. No. 60/317,832 which was filed Sep. 6, 2001.

BACKGROUND OF THE INVENTION

1. Field of the Invention

The present invention is directed to the field of email processing, utilizing existing users' desktop computer systems or a user's email server, an intermediate server system which forwards users' emails in accordance with preconfigured user preferences stored on the server. In particular, the system and the method of the present invention provide for the retransmission of emails received on a user's desktop, through the internet, to a forwarding server, which contains a users preferred profile information with respect to desired remote deliver of such email traffic. In the preferred embodiment, a user of the system installs an application on the user's desktop used for the user's electronic communications. The desktop application sends all of the user's incoming email, through the internet, to an intermediate server which contains predefined user profiles determined by the user. The user determines what email traffic should be redirected to that user at a remote location, defining further the means of transmission and the means of delivery which the user prefers. The user receives the email traffic on a remote communications device such as a cell phone. The forwarding server selects all of or defined portions of the email, converts the selected portions from text to speech, and forwards the speech-based message to the user at the selected location. The user may choose to ignore the message, or listen to selected messages translated into speech and respond to such messages using speech to generate the response.

The system allows for the user to provide preferences as to what email traffic will be forwarded to the user at the remote location, and how the email traffic will be presentation to the user, such as delivery to the user upon user request, or real time delivery to the user on a rush basis as the email traffic is received.

2. Background of the Invention

Present systems for email handling and redelivering include replicating information from a host system for use at the users remote device, such as a PDA, laptop computer, pager or web-enabled cell phone. Synchronization systems are also well known, which allow for the user to retrieve email traffic off a desktop computer system and store such traffic in the user's portable data device. Emails may then be reviewed while on the go or when time permits at a location away from the user's desktop system. Such synchronization can also be accomplished utilizing dial-up services or internet synchronization by a user "dialing in" to a host system and downloading current or new information from the host system, as well as uploading any response or email replies the user may have generated from the remote location.

Other systems and methods push information from a host system to a remote data communications device by redirecting the email traffic from the user's host system, via the internet, to a wireless personal digital assistant or other mobile data communications terminal, which allows the user to both read email redirected to the user's current location, and respond to the email from that remote terminal without the need to return to the user's host system to send such replies.

The general problem with the current systems available for either synchronization or real time redirection of email traffic is the inconvenience of the method of delivery and the method of defining the events which drive the retransmission or redirection of email traffic which may be desired. Users of email frequently prefer the convenience of accessing email traffic on either a remote telephone or cellular phone located away from the user's desktop, while retaining the convenience of voice communications with speech dictation as is frequently used in day to day business communications.

The advantage of email is the time shifting of the communications which email provides, when both the originator and the recipient of the email are not available at the same time to converse real time. However, email traffic is, by its nature, text-based and receipt of same requires the review of a data communications terminal screen for the purpose of reading the text and replying on a keyboard if a keyboard is available. Methods of email remote forwarding have not provided effective text to speech delivery while also providing reply means. Users of email would prefer the convenience of voice communications with the time shifting and documentation available in using an email text message.

Accordingly, it is the objective of the present invention to provide a means for processing email located on a user's host email system by re-sending or collecting such email from the user's system to an intermediate email server which contains predefined user preferences for the retransmission of the email to the user. Once email traffic is selected by the user, in accordance with the user's profile, the message is converted from text to speech for forwarding to the user at a remote location. The email messages are available for the user either by user access at the user's discretion, or by pushing the messages to the user on a real time basis, calling the user at a user preferred telephone number. In one embodiment of the invention, the email headers containing a reference for the message are read first to the user, allowing the user to determine whether to listen to the entire message or skip to the next message. A user may also elect to listen to only a short portion of each message by selecting defined keys on a telephone key pad to enable such a function. After receiving messages through text to speech conversion, the user may request that replies be prepared to the email, using speech to text processing which takes place on the forwarding server. The response email generated by the user is sent to the originator in accordance with the user's preferences.

SUMMARY OF THE INVENTION

The current invention overcomes the problems identified in present email redirection systems, which continue to require the user to read the text and to reply to any email messages using text formats. As used in the present disclosure, the term desktop refers to the user's home or office desktop computer system, it being understood that the main email address for the user resides on the actual email server for the user. The email application which either forwards or replicates and forwards the user's email traffic may be installed in either location depending on the configuration desired. The user's email server or email service may also be considered the user's desktop for the purpose of the present invention.

The term forwarding server refers to an intermediate server connected to the internet, which interfaces with both the user's desktop and/or the user's email server, and a user's selected remote location communications device such as a cell phone, PDA or other speech or text-capable device. In the preferred embodiment of the present invention, the user's desktop system is a conventional PC or laptop installed in the user's main location where the user would normally receive email. Alternatively, the user's desktop could also be a network server connected to an enterprise via a local area network such that all of an enterprise's email traffic, whether external or internal, can be redelivered to a user in accordance with the requirements of that enterprise.

A computer program operating at the user's desktop enables a user to select forwarding of all, or a select subset of the user's incoming email from the user's desktop to the system's email server utilizing a communications medium, such as the internet network. The user's selected incoming email traffic is sent to the forwarding server system, which identifies the email traffic as belonging to the particular user. The forwarding server compares such email traffic against the user preferred profile information entered previously into the operating system of the server. A user of the system can determine the preferences the user has for receiving notification of new email traffic. The user may desire, for example, to be notified of email selected from a pre-determined category or list of email originators. The user may also determine that any incoming traffic should be selected by the server for retransmission to the user at one or more remote locations.

The user defines the user's remote location as their preferred remote communications device for notification of received email traffic from the user's desktop. In the preferred embodiment, the remote device is most frequently a cellular telephone, but may easily be a land-line telephone or other communications device, and may also be text devices such as a PDA, pager or other text-data appliance. Most frequently, a user would prefer to receive notification and/or delivery of email traffic to the user using a voice communications device such as a wireless telephone.

The email server in the present invention, in accordance with the user's preferred profile, will either contact the user actively, or await contact by that user whose profile indicates that the user will receive email only on an as-requested basis. In either event, the email server will translate text messages into speech for delivery to the user in a mode most convenient to a mobile user who may be driving a vehicle, or engaged in some other activity in which the user would prefer to have the emails delivered by voice as opposed to viewing a text screen on a portable device. After the delivery of the voice translated mail to the user, the user may select various options which include no response, responding immediately by voice or responding after the user listens to all the emails messages which may be available to him from the forwarding server.

Various instructions may be provided to the user so that the user may select a mode of response according to the user's preference at the moment by pressing one of the various numbers on a keypad ubiquitous to all telephone instruments, whether wireless or wireline. In responding to the email, the user may dictate a response when prompted by the forwarding server. The user's response is recorded on the forwarding server and translated from speech to text for delivery to the recipient.

In the preferred embodiment, the transcription of speech to text is performed by human transcriptionists reviewing the dictation of the email user. Alternative embodiments utilize speech to text translation engines which convert the user's reply directly to text for delivery to the intended recipient without the intervention of human transcriptionists. A further improvement disclosed is the use of redundant speech to text application engines to enhance the accuracy of the conversion from human speech to text.

DETAILED DESCRIPTION OF THE INVENTION

And now the method and system of the disclosed invention will be disclosed in detail, referring to the various figures in which like numerals refer to like parts or components. A typical subscriber using this system will be referred to as the user and the preferred home desktop location for each user shall be referred to as the user desktop 20. In carrying out the method disclosed, the user of the system defines a particular location or individual computer as the user desktop 20, nominally to be used as the main location for the receipt of email traffic directed to such user. Frequently the user's email actually resides on the email server for the user. Accordingly, the term user desktop as used herein shall include the user's actual email server.

The user's desktop contains a preferred user email application 22 which can be personal information managers such as Microsoft Outlook or other commonly known electronic mail applications to receive, collect, generate and otherwise manage the email being directed to the user desktop. The method used in the disclosed system is a configuring application 24, which functions by either interfacing with exposed application program interfaces ("API's") for existing email applications, or can function directly by acting as an email client application attached to the user desktop post office protocol ("POP") or an internet mail application protocol ("IMAP"). The configuring application can also use one of several "webmail" systems which have become popular, including such applications used for Hotmail, Microsoft Network Mail, America Online or other popular electronic mail service providers which use hyper-text mark-up language ("HTML") displayed in a typical internet browser application. Configuring application 24 can be used to handle email at the user desktop with any of the above-referenced sources.

Figure 1:
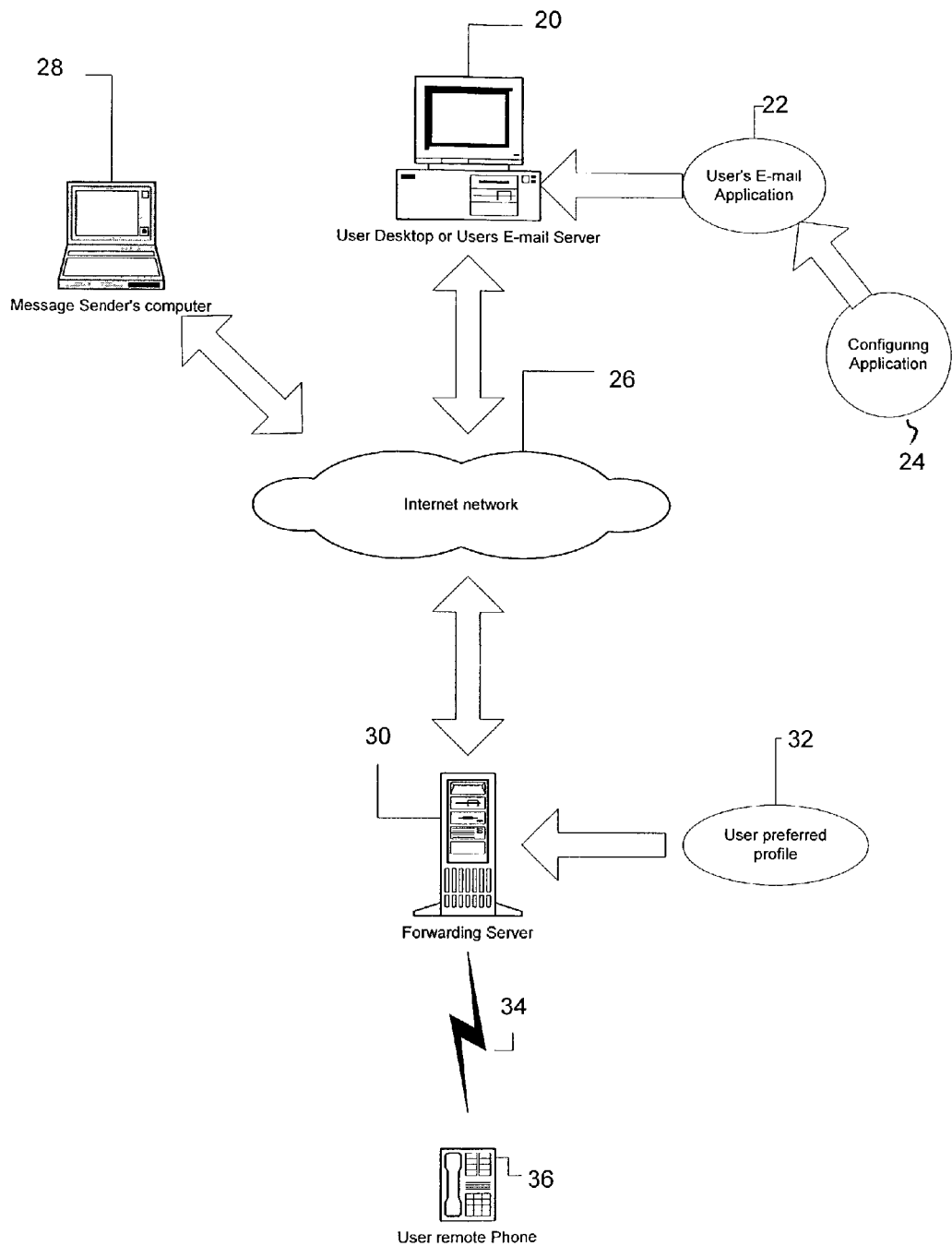
FIG. 1 is a pictorial diagram of the basic message handling system disclosed in the present invention.

Email is sent from a variety of different email sources, usually a plurality of different message senders generating electronic mail directed to the user's desktop from the message center's computer, which could be conventional computer systems, remote email text generation appliances or other types of "E machines" specialized in just generating email text traffic for transmission in a conventional fashion over internet network 26 as shown in FIG. 1. The message sender's computer 28 transmits an email message through internet 26 which is delivered to the user desktop 20. The user's desktop is ultimately a client for the user's email server, whether a locally installed computer or an email service provider server located off the user's premises. The user's email application 22 would receive and handle the email in a conventional fashion as may be set up by the user with respect to the user's preferences and the like. The configuring application 24 works with the user's email application to direct all incoming email traffic to the user's desktop back through the internet 26 to a forwarding server 30. Server 30 is preconfigured with certain user preferences for the forwarding of email messages received by server 30. It should be noted that internal email traffic be directed to the user's desktop 20 may originate within a local area network outside the internet 26, such as in a business or other enterprise which generates internal email traffic among the user's of the local area network. In either case, such email traffic is forwarded to server 30, as shown in FIG. 1.

Forwarding server 30 contains user preferred profiles 32 which define users' preferences for receiving email sent to the user's desktop. Such preferences include how the user will receive notification, what portion of new emails should be delivered to the user remotely, and how the user will actually be notified that new mail is available to be redirected from the user's desktop to the user's remote location. Preferences in the forwarding server 30, set for the user's profile 32, can provide filtering for mail only from certain sources, which include email originators which are authorized specifically or authorized as originating from a certain domain. Also, the user may prefer to have only the reference line of the email relayed and hold the text for active retrieval by the user later. Other email users will prefer to have the entire text of all email directed from their user desktops sent to them remotely, either on an as-requested basis or pushed to the user by actively contacting the user at a location programmed in the user profile 32.

In the preferred embodiment, the user may have all email traffic offered to the user at a remote location, using speech as the delivery mode. A remote communications device may be any telephonic communications system, whether a conventional land-line system or one of the many wireless appliances available for two-way voice interconnect with the telephone systems. The forwarding server would contact a user on a remote phone 36 through a communications link 34 which is either a wireline or a cellular phone transmission path, notifying the user that email traffic has been presented and inquiring as to whether the user would like to listen to the messages now or save them for later review. Assuming the user on phone 36 responds in the affirmative by selecting a simple code, usually a keypad entry on the phone, forwarding server 30, through text to speech, will present email traffic to user's remote phone 36 utilizing speech, thereby not requiring the user to review a message screen to read the email in the original test in which it was presented to user desktop 20. At the end of each presentation of email to the user, the user on phone 36 has the option to respond to each email at the time its presentation to the user is complete, or alternatively listen to all emails and deciding at the completion of the series or at a later time to produce a response to the email.

The unique feature of the disclosed system allows the user to reply to the email from a remote phone 36 by optionally selecting to reply to one or more delivered emails through dictation of a reply. The reply generated on phone 36 is conveyed back to server 30 through the communications link 34, allowing either a human transcriptionist to convert the reply to text or, in an alternate embodiment of the invention, generate the text message from speech through application programs designed to do so. Utilizing either method, the reply transmission from the user is converted to text and delivered to the message originator using what may be referred to as a shadow account created at server 30 for each user. Accordingly, recipients of the email will receive a message from the user, but from an address field which is not identical to the user's original email address at desktop 20. However, the reply message will have a "reply to" field containing the user's actual email identification, so that any new message generated as a result of the reply would be directed to the user at the user's original desktop 20. In the system disclosed, if the recipient of the reply message inadvertently uses the shadow id to generate new email to a user, server 30 can be configured to readdress the email to the user's correct email address to route the message to user desktop 20.

Application 24 is resident on the user desktop 20 and, as explained above, interfaces with the program used as the user's email application 22 so that there may be seamless integration with existing email applications which a user might prefer to maintain on desktop 20. As typically configured, application 24 can place forwarded messages to a user in the user's email application's "Sent" folder, so that a user may have an accurate record of the forwarded emails automatically accruing as the user desktop 20.

Figure 2:
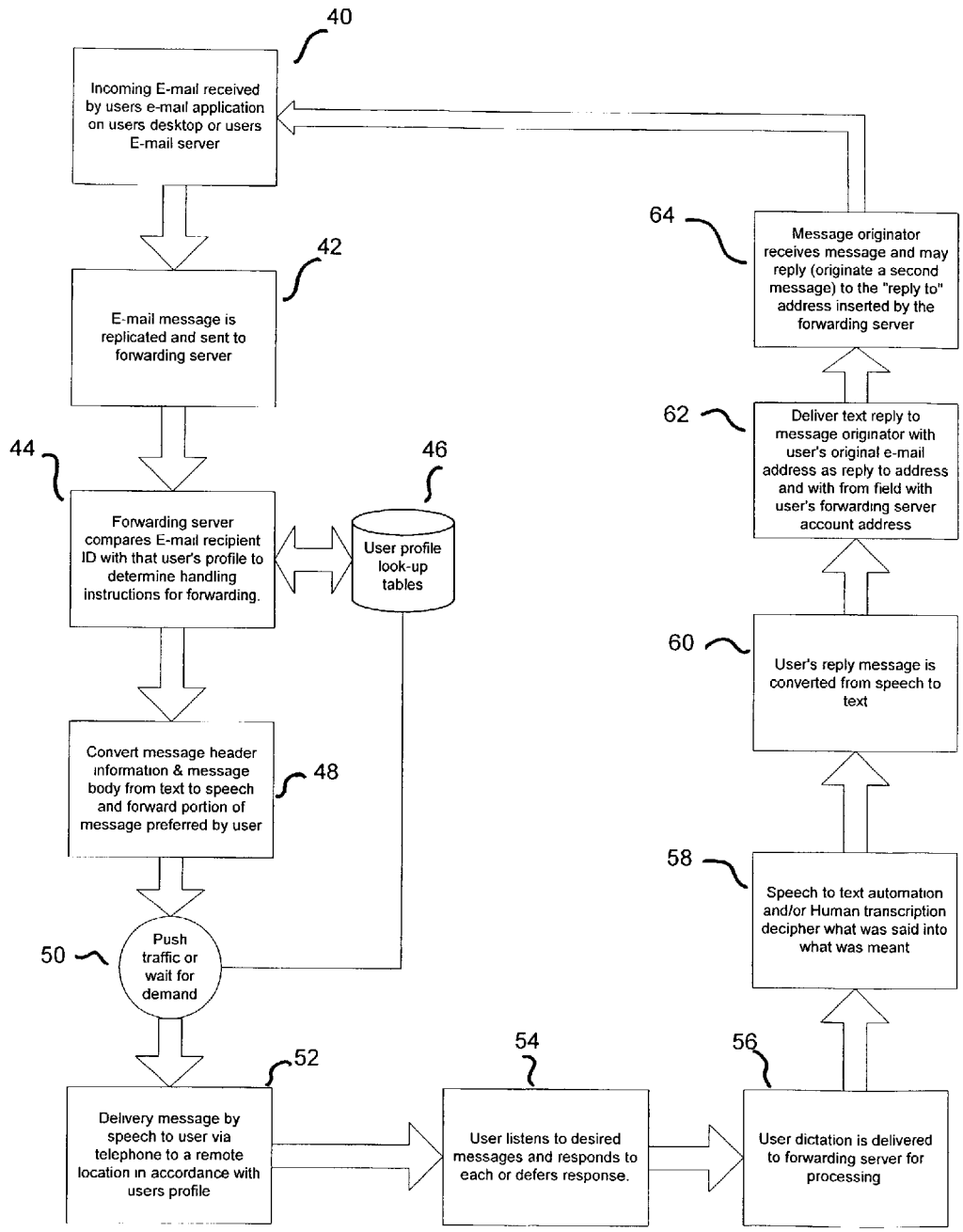
FIG. 2 is a flow chart illustrating the steps taken by the system in a typical configuration utilizing text to speech translation.

Turning to FIG. 2, a flow chart illustrating the system architecture is disclosed. An incoming email is received by the user through the users email application located in the user's desktop or the users e-mail server as shown at 40. Email messages are replicated and sent to forwarding server 30 represented at step 42. Depending on the preference of the user, e-mail messages may be sent without replication if desired. Forwarding server 30 considers the user's email identification at step 44 and compares it to the user profile database 46. Database 46 has instructions for handling the user's mail, and directs forwarding server 30 to convert the message from text to speech using typical text to speech applications or engines known to those skilled in the art, represented by step 48 in FIG. 2. It is of course possible to convert the text by manual transcription if desired for some reason.

A user might desire to have a short SMS message sent to his mobile phone notifying him that email traffic is waiting got him. SMS messages are short message texts deliverable to cell phones or other electronic portable communications devices which can operate under the common standards now available for such messaging options. The user database 46 can also be configured to either push the email traffic to the user or wait for the user to poll his account to collect messages at the user's option. Represented at 50, the system may be configured to initiate a call to the user's cell phone to announce email traffic, or wait for the user to poll.

After waiting email messages are announce to the user at 52, the user may elect to have each message read to the user in turn at 54. If the user desires to respond to any message, he dictates a reply and the speech message is forwarded to the forwarding server at 56. The voice reply can be controlled by keypad entries from the user to regulate the responses offered by selection of handling instructions through the keypad of the mobile phone.

An important feature of the system disclosed is the speech to text conversion steps, which begin at step 58 in FIG. 2. What a user may dictate in a reply message may not literally be what the user meant to convey as information literally to be converted to text verbatim. Normal speech contains substantial "noise", such as pauses, restarts and interjected instructions by the user. Manual transcription used in many offices ignore such noise found in the process, or use the noise as context for what the speaker is actually trying to convey. In such light, it is advantageous to use voice recognition software to initially convert the speech to text. However, human operator review of the actual speech file recorded on server 30, compared against the frequently inaccurate transcription performed by software applications, allows automated speech to text conversion to be enhanced and corrected. Correcting the output of such automation is preferred to manual transcription of the messages in that the best features of both voice recognition systems and a transcriptionists ability to appreciate context in human speech can be effectively combined. Such a hybrid system provides for a faster but as accurate a speech to text conversion as a pure manual transcription may produced. The savings in required manpower to produce the text reply message is considerable, given the greater throughput the hybrid system provides.

The conversion of what was said to what the user meant at 58 is processed at 60 by a transcriptionists, who would approve the user's reply before the converted text is delivered to the original sender at 62. The user's reply is sent from server 30, thus shows a "from" field in the email as being delivered from the user's account at the forwarding server 30. However, the "reply to" address sent to the original message sender does contain the user's actual email address for the user's desktop 20 shown at step 64 in FIG. 2. This provides for a reply from the original message sender to the user's actual email address.

Thus it is apparent that it has been provided, in accordance with the invention, a system and method for delivering electronic mail to the user at a previously defined remote location which fully satisfies the objectives, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed:

1. A method of notifying of the arrival of and selectively forwarding e-mail messages sent to a user's computer system to the user at a remote location transcribed to voice for delivery to the user at a remote location, comprising the steps:

receiving an email message by the user into the user's email application on the user's desktop or e-mail server;

replicating the received e-mail message for transmission to a forwarding server;

sending the replicated e-mail message to the forwarding server;

loading the user's preferred message handling profile from a look-up table into the forwarding server;

comparing the replicated e-mail message as sent to the forwarding server with the user's preferred message handling profile to select only the user preferred portion of the replicated email message to be forwarded, as loaded from the said user's profile look-up table;

wherein said user's profile look-up table includes handling instructions entered by the user for forwarding of said message;

converting the replicated e-mail message information header and replicated message information body from text to speech utilizing human transcription, wherein said human transcription is comprised of at least one human transcriber whom converts the replicated E-mail message to speech by reading the replicated e-mail message text and speaking the text for forwarding;

said transcription occurring at or after the time the replicated e-mail message is created on the forwarding server in accordance with the information loaded from the user profile look-up table;

forwarding only the portion of said message preferred by the user as set forth in the user profile look-up table;

said forwarding either occurring automatically or waiting for the user to collect said message, depending on the user preference set forth in the user profile look-up table;

redirecting said converted message to the user in accordance with the user's message forwarding instructions provided by the user profile look-up table;

delivering the message by speech to the said user via telephone to a remote location accessed in accordance with said user profile look-up table;

listening to the message by the user;

said user electing to respond or defer a response to each said forwarded message;

said user then dictating the response to said message for forwarding and processing; conversion of said user dictation by human transcription means and thereafter sending the converted response, said conversion including context recognition to determine the user's intent in providing dictation instructions to respond wherein said human transcription is comprised of at least one human transcriber who converts said user's speech to text by listening to said user's speech and converting it to text;

delivering said user's reply to the message originator, adding user's original email address as a reply-to address to direct the message originator to send any reply to the original email address of the user;

wherein then the message originator receives the user's response message bearing the reply-to address and may reply with a message to the reply-to address inserted by the forwarding server.

\* \* \* \* \*